United States Patent [19]

Filipitsch et al.

[11] Patent Number: 5,753,357
[45] Date of Patent: May 19, 1998

[54] MOISTURE ABSORBENT MATERIAL AND ARTICLES INCORPORATING SUCH MATERIAL

[75] Inventors: Claus Filipitsch, Vienna, Austria; Oleg Ivanovitsch Talalaytschenko; Albert Wassiljewitsch Fedotov, both of Novosibirsk, Russian Federation

[73] Assignee: C. Filipitsch & Co. KEG, Vienna, Austria

[21] Appl. No.: 750,259

[22] PCT Filed: May 26, 1995

[86] PCT No.: PCT/IB95/00438

§ 371 Date: Dec. 2, 1996

§ 102(e) Date: Dec. 2, 1996

[87] PCT Pub. No.: WO95/33555

PCT Pub. Date: Dec. 14, 1995

[30] Foreign Application Priority Data

Jun. 2, 1994 [RU] Russian Federation ............. 94020431
Jun. 30, 1994 [AT] Austria .................... 1297/94

[51] Int. Cl.⁶ .................. A43B 13/38; B32B 3/26; B32B 3/30
[52] U.S. Cl. ................ 428/307.7; 36/43; 36/44; 428/148; 428/155; 428/158; 428/168; 428/173; 428/312.8; 428/313.9; 428/317.9; 428/322.7
[58] Field of Search ................ 36/43, 44; 428/148, 155, 158, 168, 173, 307.7, 312.8, 313.9, 317.9, 322.7

[56] References Cited

U.S. PATENT DOCUMENTS

| | | | |
|---|---|---|---|
| 1,740,351 | 12/1929 | Isobe | 252/194 |
| 3,852,897 | 12/1974 | Bridge et al. | 36/44 |
| 4,517,308 | 5/1985 | Ehlenz et al. | 502/401 |
| 5,465,508 | 11/1995 | Bourdeau | 36/44 |

FOREIGN PATENT DOCUMENTS

| | | |
|---|---|---|
| 0 498 965 | 8/1992 | European Pat. Off. |
| 59-203637 | 11/1984 | Japan |
| 60-241930 | 11/1985 | Japan |

*Primary Examiner*—James J. Bell
*Assistant Examiner*—Blaine R. Copenheaver
*Attorney, Agent, or Firm*—McAulay Fisher Nissen Goldberg & Kiel, LLP

[57] ABSTRACT

A moisture absorbent material comprises a porous matrix of absorbent alumina, the volume of the pores of the matrix being between 60 and 90%, preferably 80 to 85% of the volume of the material. The average diameter of the pores is between $5\times10^{-9}$ and $1\times10^{-6}$ m. The pores contain a crystalline deliquescent compound, preferably calcium chloride, in an amount of between 4 and 20%, preferably between 8 and 12%, by weight, excluding any water of crystallization, with respect to the total weight of the material. The absorbent may be incorporated in a shoe insole and absorbs up to 1.5 ml moisture per gram of dry material whilst generating heat, thereby maintaining the feet of the user both warm and dry.

18 Claims, 2 Drawing Sheets

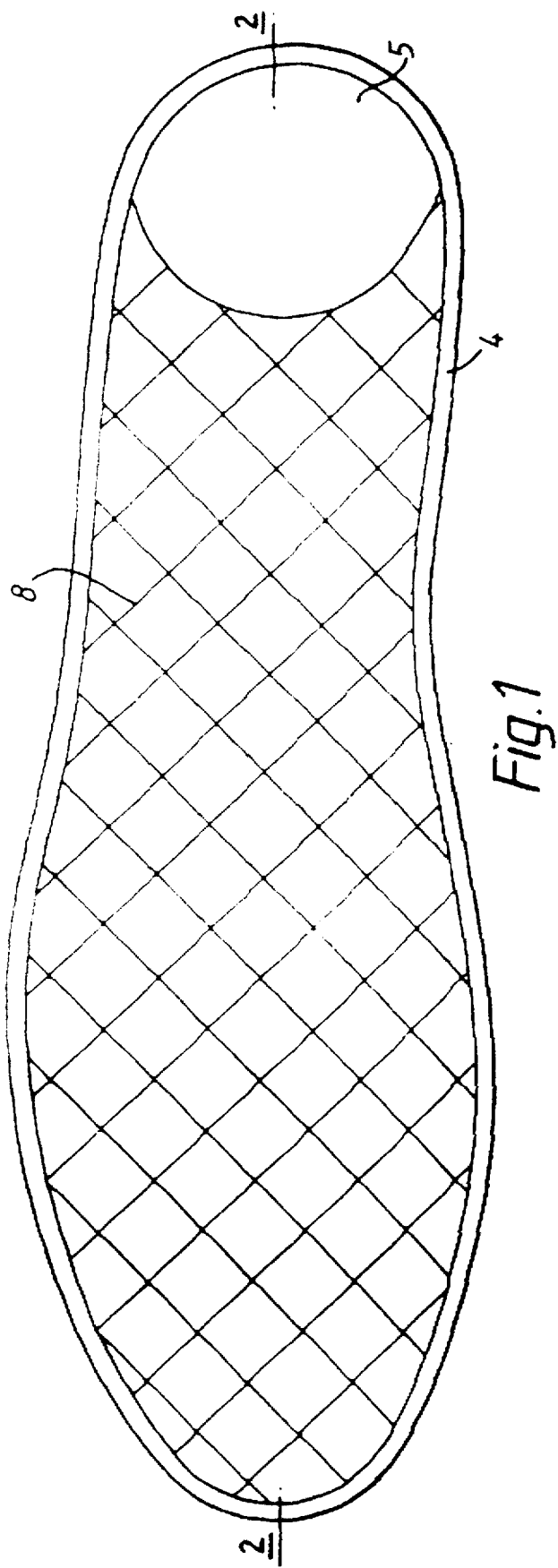

MOISTURE ABSORBENT MATERIAL AND ARTICLES INCORPORATING SUCH MATERIAL

BACKGROUND OF THE INVENTION

1. Field of the Invention

The invention relates to a moisture absorbent material and articles incorporating the material, particularly articles of clothing and footwear and components thereof.

2. Description of the Prior Art

The absorption of moisture from the environment or the reduction of moisture or humidity in a restricted space is desirable in various fields, for example in containers or the like. To this end a wide variety of moisture absorbent materials has been developed over the years.

SU-A-1452566 discloses a water absorbent material consisting of a porous granular material formed by moulding and heat treating a plastic homogenized paste containing active aluminium oxide in the form of 40 μm particles (30–55% by weight), clay (3–22% by weight), active carbon (4–10% by weight) and lithium bromide (36–45% by weight). This material is used to dry currents of air and other gases, its principal use being in breathing apparatus filters for protection against carbon monoxide. However, it is unsuitable for direct contact with human skin because it contains toxic lithium bromide, and in any case its moisture absorbency is inadequate for many purposes since it absorbs moisture at a maximum rate of 20 g per hour and per liter of this material. Moreover its moisture absorbency at a temperature of 27°–33° C. and 80% humidity is a mere 0.2 g/ml of this material. The reason for the inadequate water absorbency is thought to be that the components of the material are present in dense fine particulate form which means that only the surfaces of the particles are active, that is to say absorb and adsorb moisture.

SU-A-406552 discloses a moisture absorbent material which contains active carbon in granular form with a grain size of 1.00–2.75 mm, which is saturated with a mixture of lithium chloride and calcium chloride. The constituents are present in the following proportions by weight: active carbon (68–72%), calcium chloride (18–20%), lithium chloride (10–12%).

This material is used successfully in breathing apparatus for protection against carbon monoxide. However, the high content of deliquescent substances (LiCl and $CaCl_2$) means that a salt solution is formed by the adsorption of water which tends to escape from the pores of the active carbon matrix under high humidity conditions. In any event the toxicity of lithium chloride precludes direct contact with human skin. Moreover the low mechanical strength of active carbon results in the destruction of the material when under stress.

SU-A-1729427 discloses a shoe insole which includes a component made of hydrophobic material with depressions on its upper surface in which hydrophilic material is received and wrapped in perforated hydrophobic material. The lower layer of this component is made of metallized foil to reflect radiated energy back into the foot.

However, this proposal has several significant drawbacks. The inefficient use of the entire surface of the insole (effective coefficient 0.5) makes it impossible to achieve the required moisture-absorbent rate; whatever material is used for the insoles, it adsorbs only moisture in the form of vapor when in motion, and, the non-uniform moisture absorption through the perforations in the hydrophobic wrapper causes a significant reduction in the moisture-absorbent capacity of the insole, since heat is not transferred lengthwise (the depressions are separated by a hydrophobic medium). Moreover the regeneration of the moisture absorbent properties, after use, is complex. The heat protection and moisture absorbent properties of the insole cannot be fully restored.

The advantages of using moisture-absorbent materials in the clothing field is well known, particularly in the field of footwear. All the physiological functions of the human body are interdependent. As a homoisothermal system the body strives to maintain its temperature at a constant level of 37°±0.8° C.

Many researchers consider that the temperature of the foot should be between 27° and 33° C. at a relative humidity within the shoe of 50–70%. These levels are also regarded as the main criteria determining comfort. If the parameters fall outside these ranges the result is discomfort.

The main problem which makes it difficult to achieve optimum heat management of the feet, for example, is perspiration—amounting on average to 1 g per hour at rest and up to 15 g per hour during intense physical effort. This results in a high humidity equilibrium in the enclosed space within the shoe, normally about 100% relative.

When clothing or shoes are worn, a transfer of both moisture and heat can be observed in the body/shoe—clothing/shoe—environment system. The accumulation of moisture in the material of clothing or shoes has a marked effect during wear on the limits of comfort. While a certain combination of shoe materials (knitted fabric+lining+outer lining+upper) creates comfortable conditions for the foot (27° C.) in an ambient temperature of −9° to +20° C. at 40% humidity, in dry conditions the same materials produce comfort at ambient temperatures of −20° to +14° C. At lower temperatures the feet feel cold, while at higher temperatures they feel hot. If excess sweat and moisture are not removed via clothing or the materials of which the shoe is made, the moisture condenses as the ambient temperature falls. This substantially increases the heat conductivity of the clothing material, the sole and the other footwear components, and therefore the heat loss from the body or foot, thereby cooling it excessively. At maximum moisture content the heat conductivity of commonly-used footwear materials increases by a factor of between 5 and 7, approaching that of water (0.55 W/m*K).

It is also known that various microbes, yeasts and fungi are found on the skin of the foot. The temperature and high humidity in the shoe, in combination with the salts and fats contained in sweat, constitute an ideal breeding ground for the development of mycosis and fungal infections—from which roughly half the population suffers. Similar conditions prevail in the armpit region.

The creation of optimum temperature and humidity conditions provides the solution, increasing the sense of well-being, improving resistance to coryza and fungal infections and increasing the working capacity of the user.

Moisture absorbent materials such as untreated cotton, active carbon and metallic salts are used in the manufacture of insoles (see, for example, DD-A-273679 or DE-A-3938825) with the idea of improving heat management in the foot within the shoe throughout the entire period for which it is worn. However, the moisture absorbency of these materials is not sufficient to ensure optimum conditions for the foot for such a protracted period.

The object of the present invention is to avoid the disadvantages of previous moisture absorbent materials while providing an improved moisture adsorption capacity and preferably also a simultaneous exchange of both moisture and heat.

The further object of this invention is to improve the wearing quality and comfort of clothing, particularly footwear such as winter and sports footwear.

SUMMARY OF THE INVENTION

According to the present invention a moisture absorbent material comprises a porous matrix of adsorbent material, the volume of the pores of the matrix being between 60 and 90%, preferably between 80 and 85% of the volume of the material and the average diameter of the pores being between $5 \times 10^{-9}$ and $1 \times 10^{-6}$ m, the pores containing a crystalline deliquescent compound in an amount of between 4 and 20%, preferably between 8 and 12% by weight, excluding any water of crystallization, with respect to the total weight of the material.

The material of the present invention thus absorbs and retains moisture by a combination of adsorption by the matrix material and absorption by the deliquescent material which in practice will probably firstly absorb water in the form of water of crystallization and will then turn into a solution and continue to absorb water by the phenomenon of deliquescence. As it does so heat is also generated by the material and thus warms the body of the user of the material which is incorporated in e.g. an article of clothing or a shoe insole. Due to the substantial overall pore volume of 60 to 90%, e.g. 85% of the total volume of the material, and the small pore size, the available surface area of the matrix material is very substantial indeed, i.e. 50 to 250 $m^2/g$. This means firstly that the matrix material can adsorb a relatively large volume of moisture. More importantly, the deliquescent compound is distributed in the form of small crystals throughout the matrix material and thus also presents a large surface area at which moisture is absorbed. When the crystals turn into a solution there is of course the tendency of the solution to run out of the pores of the material but this tendency is resisted by the adsorptivity of the matrix and by the surface tension effect exerted by the very large number of very small pores. Thus the present invention allows the full potential of the adsorptivity of the matrix and the absorptivity of the deliquescent material to be made use of in combination without the disadvantage of a fresh solution of deliquescent salt being produced and then running out of the material.

The principal novel characteristic of the material in accordance with the invention derives from the fact that it combines the traditional mechanisms of moisture adsorption through the surface of the material and moisture absorption by a deliquescent salt solution. This makes it possible to "design" a moisture absorbent material precisely appropriate to the task in hand.

Moisture absorption by the material releases the heat of condensation and adsorption and this amounts to typically 1–1.5 W per 1 g/hour of moisture absorbed.

The temperature at which adsorbed water is displaced, i.e. the regeneration temperature, is typically quite high, e.g. in excess of 100° C. However, it is found that this temperature is substantially reduced if the adsorbent material is in fine pored form and a large number of small crystals of a deliquescent compound are distributed in the pores. The temperature at which the water adsorbed by a deliquescent compound is driven off is in any event typically relatively low. This means that the regeneration of the material in accordance with the invention takes place under moderate temperature conditions, preferably at temperatures of less than 60° C., e.g. between 35° and 45° C., which means that it can be used in clothing, e.g. as lining or padding, optionally only in limited regions such as the back and armpits, or for footwear, particularly for insoles, lining material or inner shoes but nevertheless easily regenerated by a domestic user. The term "insole" is used herein to describe any shoe sole other than the outer sole, i.e. a traditional insole or inner sole or a so-called midsole. Owing to its moisture absorbent and temperature-regulating effect the material in accordance with the invention can also be used with advantage in the manufacture of permanent or removable seat covers, covers for upholstered furniture and for seats in cars or other vehicles.

Whilst the material may be provided in a number of forms, e.g. plates or sheets, it is preferred that it is in granular form, preferably substantially spheroidal form with a diameter of between 0.01 and 3 mm, more preferably between 0.1 and 2 mm. The matrix may comprise a number of suitable adsorbent materials, such as aluminosilicate material, but it is preferred that it is active aluminium oxide. This substance has the mechanical strength necessary for footwear or clothing subject to heavy wear and is also non-toxic, i.e. compatible with the human skin.

As mentioned above, the overall pore volume of the material is between 60 and 90%, preferably 80 to 85% of the volume of the material. Its bulk density is preferably 0.2 to 0.6 $g/cm^3$ (ideally 0.3 to 0.4 $g/cm^3$). The specific surface area is preferably more than 150 $m^2/g$ (ideally more than 200 $m^2/g$).

It has been found that the quantity of absorbed moisture (before the solution flows out of the pores) depends on the ambient humidity and on the quantity of the deliquescent compound within the pores, and that it is greater than the sum of the moisture adsorbed by the pure matrix plus the moisture absorbed by the equivalent amount of the deliquescent compound. The reason for this is that the deliquescent compound is present in very finely divided form, i.e. it has a very large surface area.

If a correctly "designed" material is incorporated into a shoe insole it will absorb up to 0.45 milliliters of moisture per gram of the material. This value exceeds the level of all previously known absorbents by a factor of at least 2 or 3. The rate at which the process takes place is substantially reduced when all the pores are full of moisture, because at this point moisture adsorption by the matrix surface ceases and the surface of the moisture absorbing solution is substantially smaller. Moisture absorption by the material can thus be said to switch itself off. The time when this happens depends on the relative humidity at which the material is functioning and on the quantity of deliquescent compound in the matrix pores. When used in shoes, on the basis that the humidity within the shoe is always above 80%, this results in an optimum quantity of deliquescent compound in the matrix pores of 8–12% by weight.

The solution formed by the deliquescent compound is prevented from running out of the material by the meniscus or surface tension effect of the small pores. The solution therefore does not run out provided that the retaining effect of surface tension is greater than the expansion effect on the solution within the pores caused by the attraction of the solution to water produced by the deliquescent compound. The retaining or surface tension effect increases with decreasing pore size whilst the tendency of the solution to run out of the pores increases with increasing concentration of the solution, i.e. with increasing content of the deliquescent compound. These two factors must be balanced but with the pores of the size referred to above a content of the deliquescent compound of 8 to 12% by weight is sufficiently low to ensure that the solution does not run out of the pores. If the content of the deliquescent compound is significantly below this level the rate of moisture absorption and heat evolution will drop to potentially unacceptable levels.

Whilst a number of deliquescent compounds may be suitable, it is preferred that calcium chloride be used.

This is non-toxic and absorbs 6 molecules of water of crystallization per molecule and then deliquesces. Calcium chloride is easily regenerated at low temperature, and thus when exposed to a temperature of 40° to 60° C., e.g. on a domestic radiator or boiler, the solution firstly crystallizes and then the number of molecules of water of crystallization reduces to 2. A temperature in excess of 100° C. is required to remove the last two molecules of water and whilst this can be achieved in the home, e.g. in a microwave oven, it is not necessary to do so and the total absorbency of the material is scarcely reduced thereby. When calcium chloride is present in an amount of 8 to 12% by weight, measured in the anhydrous form, the material will absorb 30 to 200 g/hour per liter of material and releases heat whilst doing so.

The matrix may include a substance, such as active carbon, to remove the odor which can be created by the bacteria which typically live in shoes. Similarly, the matrix may include a perfume or the like or a bactericide or a fungicide. Such materials may be incorporated in the matrix material during its manufacture, which will be described below, in solid form.

The invention also embraces a moisture absorbent article incorporating material of the type described above. The article may constitute an article of clothing or a part or component of an article of clothing or a component of a shoe, in particularly an insole. The moisture absorbent material may in practice be situated beneath or within a moisture permeable cover sheet or be sandwiched between two such sheets. The article may be in direct contact with the skin of the user, which optimises the moisture absorbent effect and the benefit of the heat generation.

An insole may comprise two or three interconnected layers of material, of which one or the two outer layers are moisture permeable material and the middle layer defines at least one space filled with the moisture absorbent material. The middle layer may consist of unwoven fibrous material in which the moisture absorbent material is distributed in granular form. Alternatively, the middle layer may afford perforated stiffening ribs, e.g. extending in one or more sets of parallel ribs, between which there are communicating spaces filled with the moisture absorbent material.

Further features of the invention will be apparent from the following description of one specific embodiment of making a moisture absorbent material in accordance with the invention and of a number of shoe insoles incorporating such a material.

Substantially spheroidal granules of moisture absorbent material may be made by making an aqueous solution of sodium aluminate ($NaAlO_2$) and then precipitating aluminium hydroxide in solid form, so-called pseudoboemite, by adding an acid or aluminium salt. The precipitate is washed and mixed into a creamy consistency and dropped through a tube or the like into the upper portion of a reaction vessel which contains kerosene or light oil in its upper portion floating on a solution of ammonia or water rendered ammoniacal by bubbling ammonia gas through it. The suspension is immiscible with the kerosene and breaks up into spherical globules whose diameter is determined principally by the concentration of the solution but is typically set to be between 0.1 and 2 mm. These globules sink through the kerosene due to their greater density and then enter the ammoniacal solution and where they harden to form solid porous granules of aluminium hydroxide.

The aluminium hydroxide granules are then removed from the reaction vessel and dried and heated in three stages, firstly for a few hours in air, secondly for 10 to 12 hours at a temperature of 110° to 140° C. and thirdly for 5 to 6 hours at a temperature of 550° C. At this elevated temperature the aluminium hydroxide decomposes to form alumina and water. The total pore volume of the resulting alumina granules and the pore sizes may be adjusted by varying the process parameters and are set to be within the ranges set forth above. This method of making porous alumina granules is known per se and is disclosed in a monograph by Alvin B Stiles, published by Butterworth Publishers in 1987 and entitled "Catalyst Supports and Supported Catalysts", M. Chemistry 1991. The granules are, however, only known for use as catalyst supports.

An inorganic deliquescent compound, in this case calcium chloride, is then introduced into the pores of the granules. This may be effected by two different methods. In the first method a weighed amount of granules is placed in a vessel and continuously agitated. An amount of calcium chloride which will constitute between 8 to 12% of the finished granules, measured on an anhydrous basis, is then dissolved in a limited amount of water which is sprayed onto the granules. Due to the agitation of the granules the calcium chloride solution is distributed uniformly over all the granules and absorbed by them into their pores. In the second method, the alumina granules are immersed in a relatively dilute solution of calcium chloride and fully saturated. The concentration of the solution is such that the mass of $CaCl_2$ taken up by the granules will constitute 8 to 12% by weight, on an anhydrous basis, of the finished granules. In both cases the granules are then dried and the calcium chloride is left within the pores of the granules, finely distributed in crystalline form. Each molecule of $CaCl_2$ will then have 2 molecules of water of crystallisation unless the drying is performed at a sufficiently elevated temperature to drive them off, in which case the $CaCl_2$ will be fully anhydrous, though this is not necessary. The moisture absorbent granules are then ready for use.

BRIEF DESCRIPTION OF THE DRAWINGS

Two embodiments of shoe insole incorporating granules in accordance with the invention will now be described with reference to the accompanying drawings, in which:

FIG. 1 is a plan view, partly cut away, of the first embodiment;

FIG. 2 is a longitudinal sectional view on the line A—A in FIG. 1;

DESCRIPTION OF THE PREFERRED EMBODIMENTS

Figure 3:
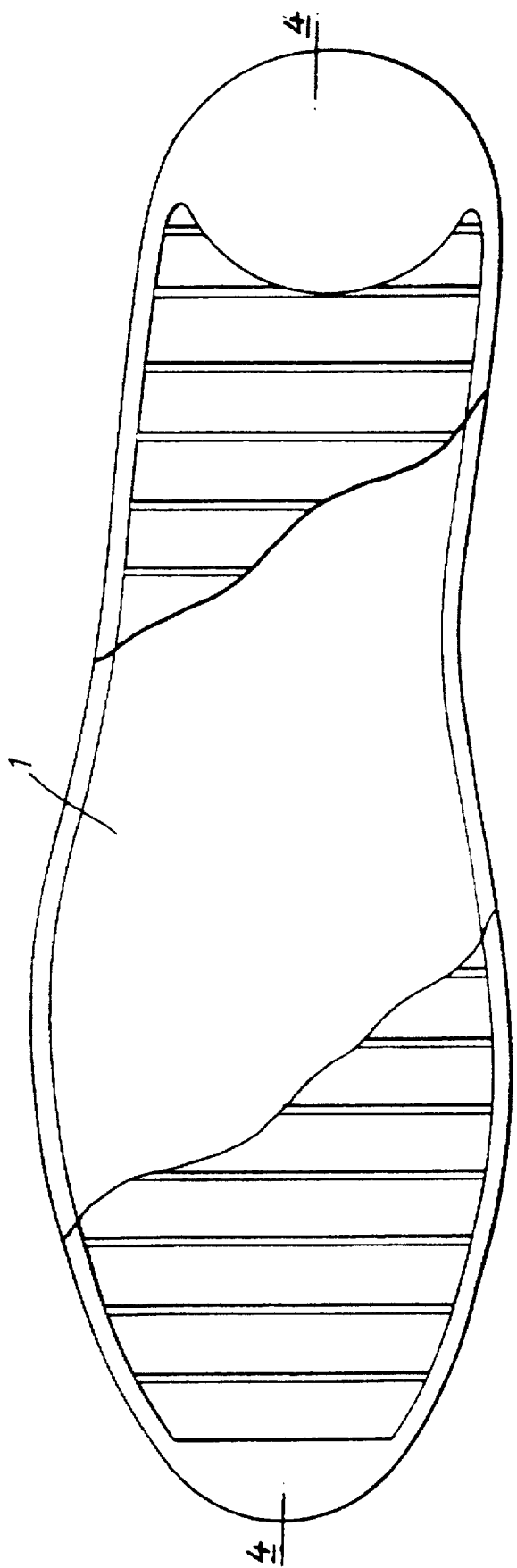
FIG. 3 is a view similar to FIG. 1 of the second embodiment.

The insole shown in FIGS. 1 and 2 includes an upper layer 1 and lower layer 2 which are manufactured from hydrophilic, moisture permeable elastic fabrics in the shape of a foot profile and between which is a middle layer 3. The upper layer 1 has a thin, soft surface and its purpose is to provide a comfortable surface for the sole of the foot. This layer allows water vapor to pass through to the granular material in the middle layer and provides high heat conductivity from the middle layer to the foot. The lower layer 2 consists of a coarse fabric with a vapour permeability coefficient of at least 20 mg/cm per hour at a vapor pressure differential of 2.300 Pa. The layer 3 includes a beaded edge 4 with a right-angled profile which consists of non-woven foam or solid material, the purpose of which is to provide the correct thickness of the insole, to connect the edges of the layers 1 and 3 and to stabilise the insole under intensive dynamic stress. In the heel part of the insole the beaded edge is enlarged at 5 to produce a shock-absorbing area for the foot when walking.

The middle layer 3 of the insole consists of space-filling unwoven fibrous material with e.g. a maximum of 50 ml of the granular material 6 evenly distributed among the fibres. The quantity of the material is determined by the type and size of insole and by the desired rate and volume of moisture absorption. The granules are in vapor communication with each other and with the entire surface of the upper layer 1, thus permitting the moisture from the foot, in both vapor and liquid form, to be transported vertically as well as longitudinally and transversely. This is an important property, since the foot gives off perspiration mainly in the region of the toes. An even distribution of moisture over the whole volume of the inset sole ensures that the heat, which is generated by the granules as they absorb moisture, is also evenly distributed over the whole surface in contact with the foot.

The layers 1, 2 and 3 are connected to each other by sewing with a heavy-duty sewing machine with a distance of 10–15 mm between stitches 8. The choice of fabric for the upper and lower layer, the thickness of the fibrous material and the quantity of the granules provide the required thickness of the insole and the period of effective moisture absorption and heat release under varying physical stress and ambient conditions.

Figure 4:
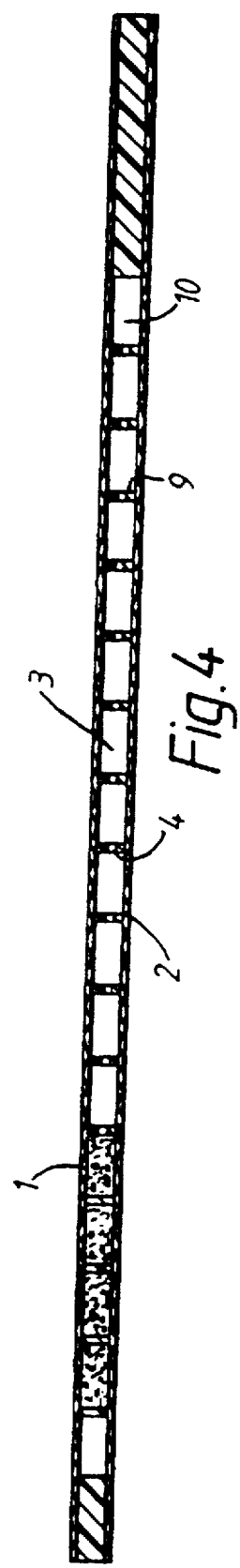
FIG. 4 is a view, similar to FIG. 2, but is taken on the line B—B in FIG. 3.

The insole shown in FIGS. 3 and 4 includes a similar upper layer 1 and lower layer 2. The middle layer 3 is manufactured by casting or punching elastic foam of the required thickness and reproduces the "anatomical" profile of the foot. Its entire volume is bounded by an enclosed edge and it has interior walls 9 with apertures 4 creating interconnected hollow spaces 10. In the toe and heel area of layer 2 are enlargements which produce a shock-absorbing function for the foot when walking.

The middle layer 3 is bonded to the lower layer 2 by adhesive with the spaces 10 filled with the appropriate quantity of moisture absorbent material and sewn to the upper layer 1 using a heavy-duty sewing machine.

The moisture absorbent material is capable of absorbing up to 1.5 milliliters of moisture per gramme of material at a temperature of 27°–30° C. and humidity of 80% without changing its physical state, i.e. with no calcium chloride solution escaping from the matrix pores. In use, the calcium chloride will absorb water of crystallization until there are 6 molecules of water of crystallization per molecule of calcium chloride. It is solid in this state when at a temperature of less than 27° C. but when in a shoe it will usually be at a temperature of more than 27° C. and it thus liquefies. The large area of the solution means that it continues to absorb water due to its deliquescence until the pores are full and the rate of absorption then substantially reduces. However, the solution is retained within the pores of the granules and can not run out.

It has been established that at a calcium chloride content of less than 8% by weight the desired rate of moisture absorption is not achieved, while at a calcium chloride content of more than 12% by weight the salt solution may escape from the pores of the aluminium oxide matrix when the temperature and humidity within the shoe are at the levels referred to above.

It has been established that when moisture is absorbed the release of heat within the shoe (adsorption heat and condensation heat) totals 1.0–1.5 W per 1 g/hour of absorbed moisture.

The regeneration of the saturated material takes place under moderate temperature conditions of between 35° and 60° C. and can thus be effected on e.g. a domestic radiator.

EXAMPLE 1

Moisture absorbent material in granular form with a grain size up to 2.0 mm. This material is a calcium chloride saturated granular aluminium oxide with a specific surface area of 200 m$^2$/g and a pore volume of 0.65 cm$^3$/g. At a temperature of 30° C. and 80% humidity 50 ml of this material, which contains 4 g of calcium chloride, absorb between 20 and 23 grams of moisture. No escape of the calcium chloride from the matrix pores is observed.

EXAMPLE 2

Moisture absorbent material in granular form with a grain size of 0.5 mm. This material is a calcium chloride saturated granular aluminium oxide containing minute particles of active carbon in the pores. At a temperature of 30° C. and 80% humidity 50 ml of this material, which contains 5 grams of calcium chloride and 0.25 g of active carbon, absorb between 20 and 23.5 grams of moisture. No escape of the calcium chloride from the matrix pores is observed.

EXAMPLE 3

A pair of insoles was manufactured according to the first embodiment with the inclusion of 50 ml of granular material. Every day for 30 days they spent 8 hours inside winter shoes at an ambient temperature of 20°–23° C. and 2 hours at a temperature of –15° to –20° C. The regeneration of the insoles took 10 hours at a temperature of 40°–60° C. The insoles were weighed each day before being worn. The daily quantity of moisture absorbed and the quantity of heat given off by the insoles remained unchanged through the entire period.

The insoles actively absorb the moisture of the foot over an extended period, thus creating comfortable temperature and humidity conditions and keeping both the foot and the shoe dry. The essential heat insulation properties of the shoe are preserved. The insole retains the capacity to recover its properties in many successive wear-regeneration cycles.

Naturally many variations are possible within the scope of the invention. The or each covering layer may be smooth or structured, have projections or no projections and be stiff or flexible. Possible materials include, for example, felt, textiles, rubber, polyurethane, synthetic resin, air-permeable non-woven fabric, woven fabric, knitted fabric, natural or synthetic fibres (viscose) or mixtures thereof, perforated or (only on one side) continuous metallic foils (e.g. aluminium), foam rubber, leather, synthetic leather and the like.

The various covering and intermediate layers can be connected by any suitable method, for example by sewing, adhesive and the like, and the layers can be connected within the edges by stepping, needling and the like.

Finally the use of covering and intermediate layers can be avoided by treating the moisture absorbent material with suitable binding agents to produce soft or hard (or age-hardening) substances. This can itself be used to manufacture the above-mentioned clothing and footwear components and the like to achieve both the required mechanical strength and the shape of the article in question. A shaped insole or midsole could then be manufactured by moulding this substance and, if necessary, hardening it. It may be appropriate to apply it to a carrier layer.

While preferred embodiments of the invention have been shown and described in detail, it will be apparent to those skilled in the art that various changes and modifications may be made without departing from the basic principles of the invention as embraced by the following claims.

We claim:

1. A moisture absorbent material comprising a porous matrix of adsorbent active aluminium oxide, the volume of the pores of the matrix being between 80 to 85% of the volume of the material, the bulk density of the matrix being between 0.3 and 0.4 g/cm$^3$, the specific surface area of the matrix being greater than 150 m$^2$/g, and the average diameter of the pores being between $5 \times 10^{-9}$ and $1 \times 10^{-6}$ m, the pores containing a crystalline calcium chloride in an amount of between 8 and 12% by weight, excluding any water of crystallization, with respect to the total weight of the material, whereby the material may be substantially regenerated at a temperature between 35° and 45° C.

2. The material of claim 1 wherein said material is in granular form with a diameter of between 0.01 and 3.0 mm.

3. The material of claim 2 wherein said granular form is substantially spheroidal.

4. The material of claim 1 wherein said material is in granular form with a diameter of between 0.1 and 2.0 mm.

5. The material of claim 4 wherein said granular form is substantially spheroidal.

6. The material of claim 1 wherein the matrix includes a deodorizing substance.

7. The material of claim 6 wherein the deodorizing substance is active carbon.

8. The material of claim 1 wherein the matrix includes one or more of a perfume, a bactericide and a fungicide.

9. An article incorporating moisture absorbent material, said material comprising a porous matrix of adsorbent active aluminum oxide, the volume of the pores of the matrix being between 80 to 85% of the volume of the material, the bulk density of the matrix being between 0.3 and 0.4 g/cm$^3$, the specific surface area of the matrix being greater than 150 m$^2$/g, and the average diameter of the pores being between $5 \times 10^{-9}$ and $1 \times 10^{-6}$ m, the pores containing a crystalline calcium chloride in an amount of between 8 and 12% by weight, excluding any water of crystallization, with respect to the total weight of the material, whereby the material may be substantially regenerated at a temperature between 35° and 45° C.

10. The article of claim 9 wherein said material is in granular form with a diameter of between 0.01 and 3.0 mm.

11. The article of claim 10 wherein said granular form is substantially spheroidal.

12. The article of claim 9 wherein the matrix includes a deodorizing substance.

13. The article of claim 9 wherein the matrix includes one or more of a perfume, a bactericide and a fungicide.

14. The article of claim 9 wherein said article is a shoe insole.

15. The article of claim 14 wherein said insole comprises at least two interconnected layers of material, and wherein one of said layers is moisture permeable and another of said layers defines at least one space filled with said moisture absorbent material.

16. The article of claim 15 wherein said layers of material comprise two layers of moisture permeable material between which is a middle layer of unwoven fibrous material, said moisture absorbent material being distributed in said middle layer in granular form.

17. The article of claim 16 wherein said middle layer has a plurality of spaced apart perforated stiffening ribs, the spaces between said ribs being filled with said moisture absorbent material.

18. The article of claim 17 wherein said stiffening ribs extend in one or more sets of parallel ribs.

* * * * *